United States Patent
Cross et al.

(10) Patent No.: US 10,157,158 B2
(45) Date of Patent: Dec. 18, 2018

(54) METHOD AND APPARATUS FOR DISTRIBUTED COMPUTING USING CONTROLLER AREA NETWORK PROTOCOLS

(71) Applicant: FORD GLOBAL TECHNOLOGIES, LLC, Dearborn, MI (US)

(72) Inventors: Matthew Charles Cross, Lake Orion, MI (US); Joann Xing, Canton, MI (US); Peter Treman, Commerce Township, MI (US); Chad Everet Esselink, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 15/417,370

(22) Filed: Jan. 27, 2017

(65) Prior Publication Data
US 2018/0217953 A1    Aug. 2, 2018

(51) Int. Cl.
| | |
|---|---|
| *G06F 13/364* | (2006.01) |
| *G06F 13/40* | (2006.01) |
| *G06F 13/42* | (2006.01) |
| *G06F 9/54* | (2006.01) |
| *G06F 9/48* | (2006.01) |

(52) U.S. Cl.
CPC ......... *G06F 13/364* (2013.01); *G06F 9/4843* (2013.01); *G06F 9/4881* (2013.01); *G06F 9/547* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 6,072,781 A * | 6/2000 | Feeney | G06F 9/544 370/229 |
| 7,317,990 B2 | 1/2008 | Sinha et al. | |
| 7,953,876 B1 * | 5/2011 | Roman | H04L 69/163 370/463 |
| 7,991,351 B2 | 8/2011 | Kuban | |
| 2008/0002682 A1 * | 1/2008 | Srinivasan | H04L 45/00 370/389 |
| 2009/0219936 A1 * | 9/2009 | Tripathi | H04L 41/00 370/392 |
| 2012/0218412 A1 * | 8/2012 | Dellantoni | G01C 21/3602 348/148 |
| 2013/0151220 A1 * | 6/2013 | Matsumura | G06F 11/261 703/7 |
| 2014/0130063 A1 | 5/2014 | Barrett | |
| 2016/0325754 A1 * | 11/2016 | Stahulak | B60W 40/08 |
| 2017/0192770 A1 * | 7/2017 | Ujiie | G06F 8/654 |

* cited by examiner

*Primary Examiner* — Henry Tsai
*Assistant Examiner* — Christopher A Bartels
(74) *Attorney, Agent, or Firm* — Jennifer Stec; Brooks Kushman P.C.

(57) ABSTRACT

A system includes a first electronic control unit (ECU) processor configured to function as a scheduler, connected to a bus on a controller area network. The processor is also configured to receive an availability notification, indicating ECU available processing power, from a second ECU connected to the bus. The processor is further configured to instruct the second ECU to become the scheduler, responsive to a determination that the ECU available processing power is greater than processing power available locally on the first ECU.

16 Claims, 4 Drawing Sheets

METHOD AND APPARATUS FOR DISTRIBUTED COMPUTING USING CONTROLLER AREA NETWORK PROTOCOLS

TECHNICAL FIELD

The illustrative embodiments generally relate to a method and apparatus for distributed computing using controller area network protocols.

BACKGROUND

The eight fallacies of distributed computing are commonly referenced when discussing distributed computing. The fallacies are as follows: the network is reliable, latency is zero, bandwidth is infinite, the network is secure, topology does not change, there is a single administrator, transport cost is zero and the network is homogeneous.

Engineers carefully consider these fallacies when creating any distributed computing system, and engineers typically account for the fallacies in any system design. In most distributed computing systems, a central operating system controls the system. In such a model, the central operating system can coordinate all of the aspects of the system.

Controller Area Networking, or CAN, is a networking standard used primarily in the automotive industry. Bosch Automotive invented CAN in 1986 as a way for automotive ECUs to communicate with each other. The standard saw increasing use through the 1990s and is now on every vehicle on the road today throughout the world. Some industrial applications also use CAN, but the automotive industry remains the primary user of CAN.

The CAN bus is comprised of a single twisted pair of wires that connect all ECUs on the network together. There is no router or other controller necessary other than the CAN controller on each ECU attached to the network. The unique priority/identifier field in every CAN message provides not just a priority in a software sense, but high priority messages also overwrite lower priority messages electrically, grounding out the lower priority signals.

A CAN message is comprised of several parts: an arbitration field, a control field, a data field, a CRC field, and an end of frame field. The arbitration field is comprised of the CAN identifier bit string, which doubles as the message priority. From there, the control field exists to tell other ECUs how large the data field will be. The data field can consist of 1 to 8 bytes (8 and 64 bits) of information. Finally, the CRC field and End of Frame fields provide data integrity and notification to the bus that the message is complete.

The arbitration field is fixed for a particular message. Each message has a unique identifier, though multiple of the same messages may be sent over CAN. Typically, a CAN Database, or DBC, file stores definitions of all messages for a particular bus. All ECUs on the network have access to the DBC file for decoding any and all incoming messages. Messages may not have their identifiers changed at random to protect the integrity of the system.

The data field is only 8 bytes, significantly smaller than most networking systems. This makes it difficult to send anything more than a short string or characters or a single large number. Typically, CAN messages are broken down further into signals, which have defined values and bit locations within a message. This data is typically stored in the DBC file.

Automobiles typically have dozens of ECUs in various locations throughout the vehicle. Typically, each ECU handles a specific set of functions. For example, an Engine Control Module controls aspects of the engine, and a Body Control Module may control all of the interior lighting and door functions of the vehicle. All of these modules in the vehicle are bound together using the CAN bus. Depending on the message load on the bus, typically about 20-30 nodes are connected to a single bus, but multiple buses may be used in a single vehicle. Vehicles from 2007-2015 typically used two buses, but as complexity increases, the number of buses can go to three, four, or beyond.

CAN is available on almost every vehicle produced today, largely due to industry wide utilization of the OBD-II standard.

SUMMARY

In a first illustrative embodiment, a system includes a first electronic control unit (ECU) processor configured to function as a scheduler, connected to a bus on a controller area network. The processor is also configured to receive an availability notification, indicating ECU available processing power, from a second ECU connected to the bus. The processor is further configured to instruct the second ECU to become the scheduler, responsive to a determination that the ECU available processing power is greater than processing power available locally on the first ECU.

In a second illustrative embodiment, a system includes an electronic control unit (ECU) processor configured to determine that a predetermined number of processing cycles are available for use by other ECUs. The ECU is also available to broadcast availability notification to a bus on a controller area network, including an indicator of available processing power derived from the predetermined number. The ECU is also configured to receive a designation as a worker ECU or a designation as a scheduling ECU responsive to the broadcast.

In a third illustrative embodiment, a system includes a controller area network including at least a bus and a plurality of ECUs connected to the controller area network via the bus. In this embodiment, at least one of the ECUs includes a processor configured to receive designation of a parameter to be tracked, from the bus. The processor is also configured to collect data corresponding to the parameter, responsive to the at least one ECU determining that processing cycles on the at least one ECU are available to be used to perform collection. The processor is additionally configured to translate the data into a predesignated exportable format to generate formatted data and broadcast the formatted data back to the bus.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
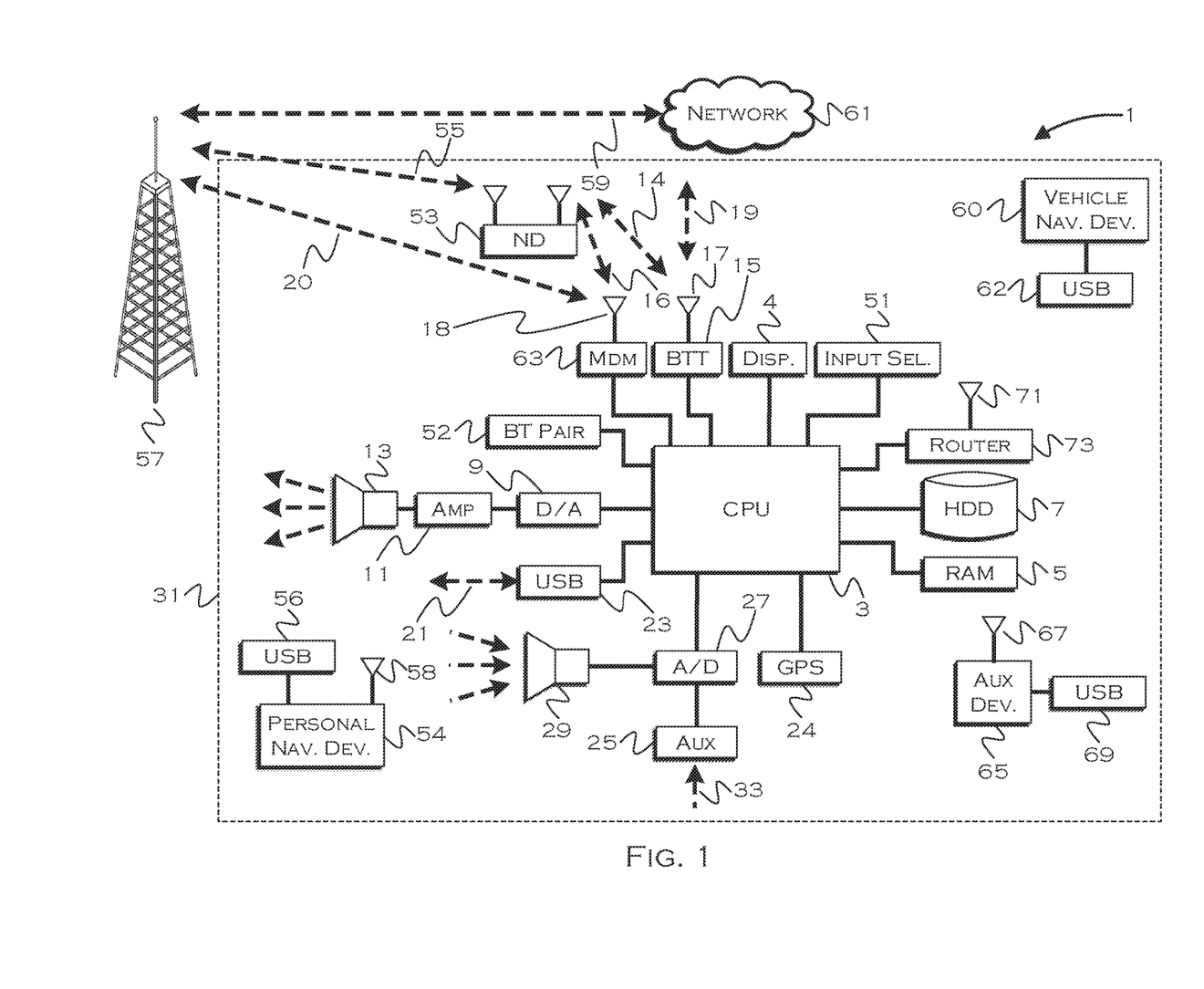
FIG. 1 illustrates a representative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs of the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WI-FI access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WI-FI and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WI-FI) or a WiMax network.

In one embodiment, incoming data can be passed through the nomadic device via a data-over-voice or data plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but is not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

The idea of a distributed computing system has been around for a long time, but there are always new avenues for research and innovation in the field. The widespread use of Controller Area Network (CAN) messaging systems in a number of important industries means that CAN is a possible tool for distributed computing applications. CAN represents an interesting possible backbone in a network based distributed computing system in that it is a medium speed, priority based system, with soft real time guarantees for high priority messages.

There are two major considerations with a CAN based automotive system. First, cost is a large factor when developing an automobile and the ability to reduce the cost even by a small amount has a large impact on the overall system. Second, existing vehicles do not fully utilize the computing power of electronic control units (ECUs) that are part of the vehicle. The illustrative embodiments propose a system where the excess computing power of the automobile may be used provide power elsewhere in the system (or in some cases, as directed from outside the system).

The automotive industry is the primary user of CAN systems, but CAN has made inroads to other industries in recent years. The widespread use of the protocol combined with the high number of computing units within a vehicle presents an opportunity to use this network to reduce the power of individual processors on the CAN network to use the collective power of the processors on the network. Possible applications of distributed computing have many applications within the automotive industry and provide boosts to applications such as big data collection, supercomputing, and other possible applications. Additionally, one of the primary benefits of CAN is its real time guarantees. By utilizing real time concepts and combining them with a distributed computing system in a moving vehicle, distributed computing in a vehicle environment gains unique advantages.

One challenge to implementing a CAN based distributed computing system is the CAN protocol and its very small message size. A CAN message can only contain 8 bytes of information. This limitation excludes it from many different types of distributed computing frameworks and remote procedure call systems currently in use today.

CAN networking is an interesting standard when compared to more traditional computing and networking standards. CAN networks have a relatively high data throughput (up to 1 Mbit/s), but are restricted by a small data packet size. Not counting header information, the bus can typically only handle packets of a maximum of 8 bytes of information.

CAN is also a priority based network. Systems using CAN always send messages with higher priority before messages with lower priority. This is because of how the bus is set up electrically. Higher priority messages have a lower value for its arbitration ID. The lower the arbitration ID, the more zeroes in the first bits of the ID, which will ground out any high IDs. As such, lower priority messages must wait until the high priority message has finished sending before attempting to send again. Several high priority messages may be sent before a low priority message gets it turn on the bus. Fortunately restrictions in the number of nodes on the network, combined with the relatively high data rate compared to the message size, serve to ensure that every message will be sent.

Messages with a high priority have stronger real time guarantees than messages with lower priority. For example, in vehicles, safety critical messages have the highest arbitration IDs to ensure that the messages are always sent.

CAN is also multi-cast. Every node on the bus can read every message on the bus. This is especially useful for the way that CAN arbitrates which message is to be sent, and all nodes must listen for an end of frame bit sequence before attempting to write to the bus again. As such, all messages can be read by any module on the network.

The CAN bus has the major advantage of being a real-time priority based network. The higher the priority of a message, the stronger the real time guarantee of the message. In addition, due to the small message size, transmission send times are a known, finite value, based only on the message speed and the message type (normal or extended addressing). This makes CAN messages predictable, though they may be pre-empted by a higher priority message. Nonetheless, it is fair to assume that a high priority message will be transmitted quickly. This makes CAN ideal for systems that require real time attributes, and is especially important in the automotive industry where delay of milliseconds could result in a crashed vehicle.

One of the biggest advantages of distributed computing on a small, contained CAN network is that some of the eight fallacies of distributed computing are actually not false.

Specifically: the network is reliable, the network is secure, topology doesn't change, there is one administrator and the network is homogeneous.

The network must be reliable or the system crashes. As such, the system cannot work with an unreliable network and it must be assumed that if the system is running, the network is reliable. Next, in at least most automobiles on the road, it is impossible to access a CAN network without physical access to the network. Because of this, once a vehicle's network is established, the network can be assumed to be secure, and it can be assumed that the topology does not change.

On top of this, there is commonly only one administrator because if there is any physical access to the network, only one person is accessing the network for diagnostic reasons. There are few reasons to access the self-contained system of a CAN network, and as such, it is extremely safe to assume that if the network is being accessed by a human, only one person has access. Finally, it can be assumed that the network is homogenous because of the CAN protocol and its strict rules for messages.

There are many available ECUs within an automotive system, and these ECUs are not necessarily constantly doing work. All ECUs are connected to each other and constantly listening to all messages on the CAN bus. The illustrative embodiments propose that an ECU may have free cycles where it may do work for other ECUs within the system, in the fashion of a distributed computing operating system.

Several sections of software may need to be present on the ECUs involved in the distributed computing system, particularly software defining functions to be run when the ECU is idle. These sections of code provide the bulk of the throwing power of the system. ECUs that do not have the proper code may be excluded from the idle-time compute operations.

One of the most difficult challenges of this system is scheduling processes based on the availability of resources. In such a dynamic system, where resources may or may not become available based on their own processing needs (i.e., to perform the functions for which the ECU was actually designed), the overall power and number of available ECUs at any given time is dynamic. ECUs running processes that could benefit from the processing power of the system would confirm resource availability with a scheduler. The scheduler would handle knowledge with respect to which ECUs were available and how much processing could be done by the available ECUs. Whether or not an ECU could perform a particular processing request could also be known by the scheduler, which could be useful in a scenario where an original equipment manufacturer (OEM) provides ECUs with varied secondary capability.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Figure 2:
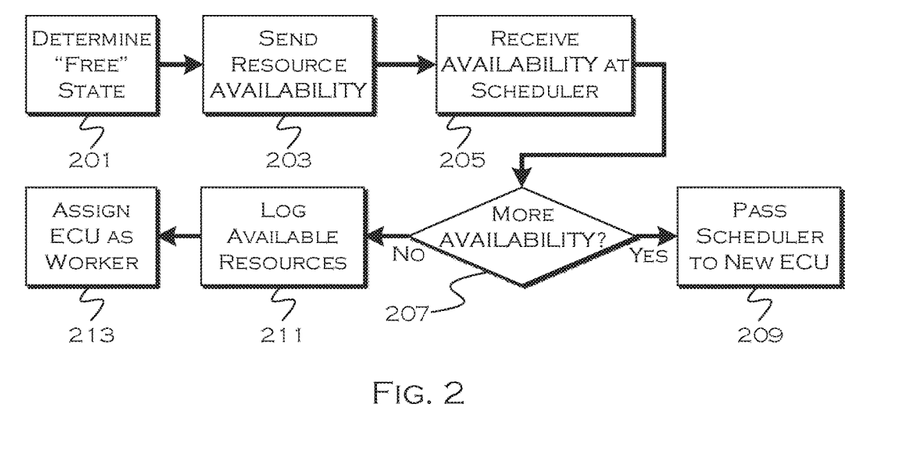
FIG. 2 shows an illustrative example of dynamic resource tracking within a CAN environment.

FIG. 2 shows an illustrative example of dynamic resource tracking within a CAN environment.

All messages on the CAN network are sent to all modules, which works towards the advantage of a distributed system. A scheduler ECU could use a system similar to a bully algorithm to take control of the entire system's extra resources. When an ECU becomes available 201, the ECU reports 203 to the entire network that it is: a) available; and b) has availability for a certain amount of time or with a certain processing rate (jobs per second perhaps). ECUs with idle cores could report availability of some processing power, without advertising the full processing power of the ECU. Going one-step further, a priority could be created from an ECU's available resources. This priority would then act as an order for a bully algorithm.

If a newcomer ECU with availability has more availability than the current scheduler does, the newcomer ECU could take control of scheduling miscellaneous jobs (i.e., become the scheduler). In the illustrative example, the current scheduler receives notification from the newcomer ECU that the newcomer ECU has available resources 205. If the newcomer ECU has more resources available than the current scheduler ECU 207, the current scheduler makes the newcomer ECU the scheduler 209. If the newcomer ECU has less resources than the current scheduler, the current scheduler logs what resources are available on the newcomer ECU 209 and assigns the newcomer ECU as a worker module 211.

Figure 3:
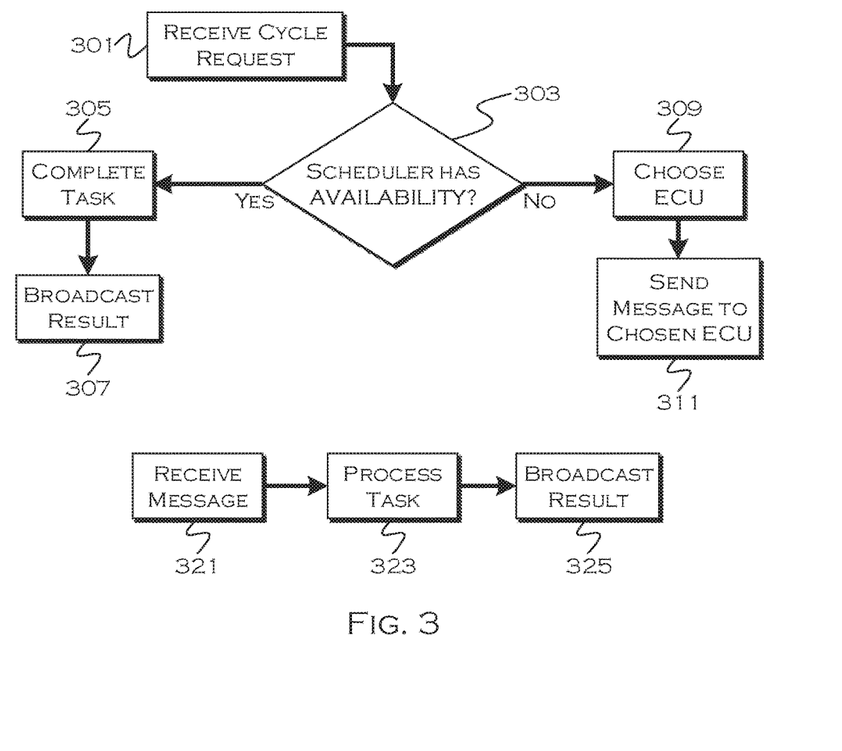
FIG. 3 shows an illustrative example of job request handling.

FIG. 3 shows an illustrative example of job request handling.

Whenever an ECU requests a job from the system, the scheduler could then act as a hub, listening for the request message 301. If the scheduler itself has the necessary cycles or threads available to complete the job 303, the scheduler creates a thread to complete the job 305 and immediately send the results 307, without forwarding the message on to a specific ECU. Because it is a multi-cast system, the response would not need to go through the scheduler, reducing overhead and number of messages being sent to the bus.

If the scheduler has insufficient current resources to complete the job, the scheduler chooses a worker module ECU 309 and assigns the job to the chosen ECU for completion 311. The chosen ECU receives the message from the scheduler 321 and utilizes available ECU cycles to process the task associated with the message 323. The ECU can then broadcast the result of the task 325. The requesting ECU (that originally requested assistance) can obtain the result of the task from the bus, since the network is multi-cast.

A problem with CAN resource scheduling is the dynamic availability of processors on the network. Available processing power varies constantly with the number of ECUs that are available at any given moment. This is where an availability rating, which can also be used to determine priority, is useful. By adding the total availability of the system, it is possible to determine the total jobs that the system could do at any one point in time. Jobs that require more resources than the system has available would be denied or forced to wait until the system was at full speed again.

Figure 4:
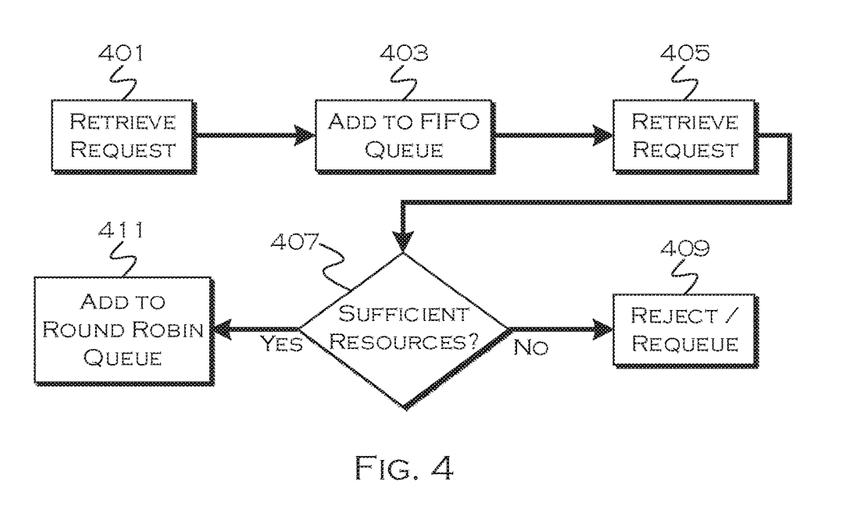
FIG. 4 shows an example of request handling in a multi-tier manner.

Once the system has chosen a scheduler, the scheduler then must schedule possible jobs coming from a variety of sources. FIG. 4 shows an example of request handling in a multi-tier manner.

In this example, ECUs requesting the shared resource would all have the ability to submit a request. This request would include a specific message sent on the bus that the scheduler would respond to when the request received. The scheduler would schedule jobs to be processed in a multi-tiered manner. This involves the scheduler retrieving the request from the bus 401 and adding the job to a first in first out (FIFO) queue 403.

The scheduler retrieves jobs added to the queue in a first come first served manner 405. The scheduler then determines if any ECU (or ECUs) have sufficient available resources to process the job 407. If there are sufficient resources, the scheduler adds the job to a round robin queue 411, and if there are currently insufficient resources, the scheduler can either reject the job (which could include informing the requesting ECU that the job was rejected) or requeue the job in the FIFO queue 409. If a job request comes in for which sufficient resources currently do not exist, the scheduler simply does not respond to (or rejects) jobs that require more resources than are available.

This scheduling system does not require foreknowledge of all of the jobs that are going to be run. FIFO allows jobs to be added as they come, although it is not the only type of queuing that could serve this purpose. Once the scheduler transfers the jobs are transferred to the lower queue, round robin has several synergies with the CAN network, specifically, it plays very well with the quick, well-defined messages, and it works well with many short jobs. Other similarly advantageous queuing strategies could also be used for job handling.

If the scheduler does not reassign a newcomer ECU to become the scheduler, the scheduler would designate the newcomer ECU as a worker node. Worker nodes remain idle until sent a job by the scheduler (or until the node has a task designated for the typical function of the ECU).

The nature of a job would is pre-determined by a CAN message and the method or algorithm that is needed to complete the job would already exist within an ECU's codebase. If the job only requires use of the ECU processing power, then the job would would execute and return the proper value as fast as possible. If the job required listening to the bus, the ECU would execute its command for as long as possible or necessary, and return the value when complete.

If a worker node's normal functionality interrupted the node while executing a remote procedure call (RPC) command, the normal functions would override the RPC command and the node would send a job failure message to the bus. The ECU could then resume its standard operations. The scheduler would then need to re-assign the job to an available resource.

Figure 5:
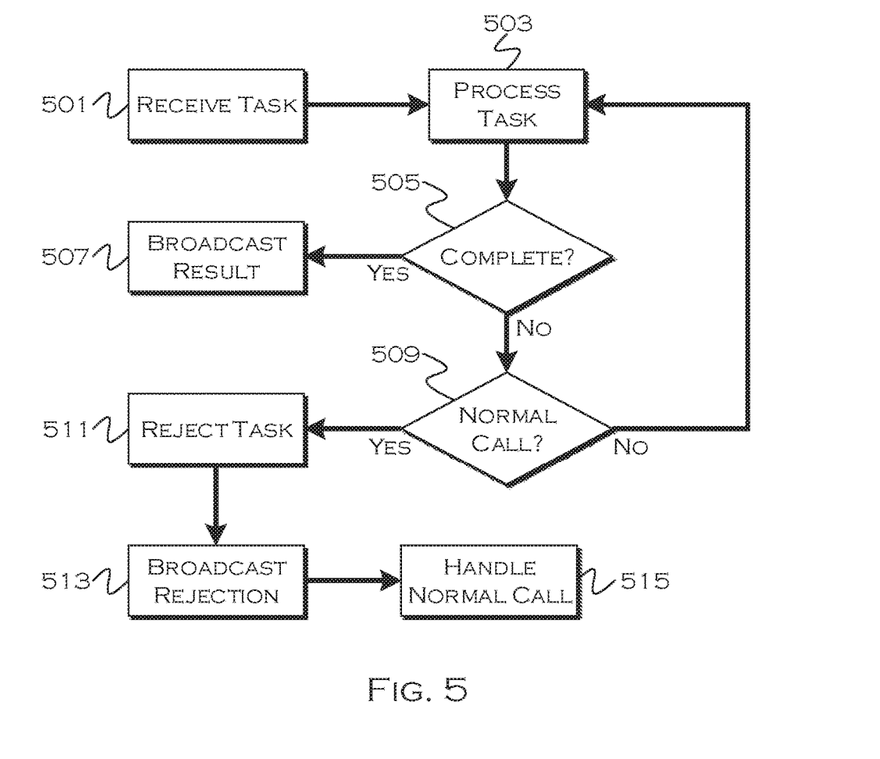
FIG. 5 shows an illustrative example of an ECU handling an RPC.

FIG. 5 shows an illustrative example of an ECU handling an RPC. In this illustrative example, the ECU receives a job (RPC) assigned to the ECU by the scheduler 501. The ECU begins to process the RPC 503 until the task is complete 505. If there is a "normal" function call 509 while the ECU is processing the RPC, the ECU will reject processing of the RPC 511 and broadcast the rejection 513 so the scheduler knows that the RPC was not completed. The ECU then handles the "normal" function call. A normal function call refers to the ECU being requested to do something for which the ECU was designed, and by allowing the ECU to drop the RPC it is ensured that the ECU does not fail to perform the tasks for which it was designed.

If the ECU completes processing the RPC without interruption 505, the ECU can broadcast the result of the RPC 507. The originally requesting entity ECU and/or the scheduler can obtain the result directly from the bus, responsive to this broadcast, since the system is multi-cast.

Data collection is seeing larger and larger use in almost every industry. Every ECU on the CAN bus stores valuable data, but rarely do the ECUs have the opportunity to offload that data in a meaningful way. If a module were to request a data dump through a remote procedure call, ECUs could use spare cycles to send that data out onto the CAN bus when convenient.

Figure 6:
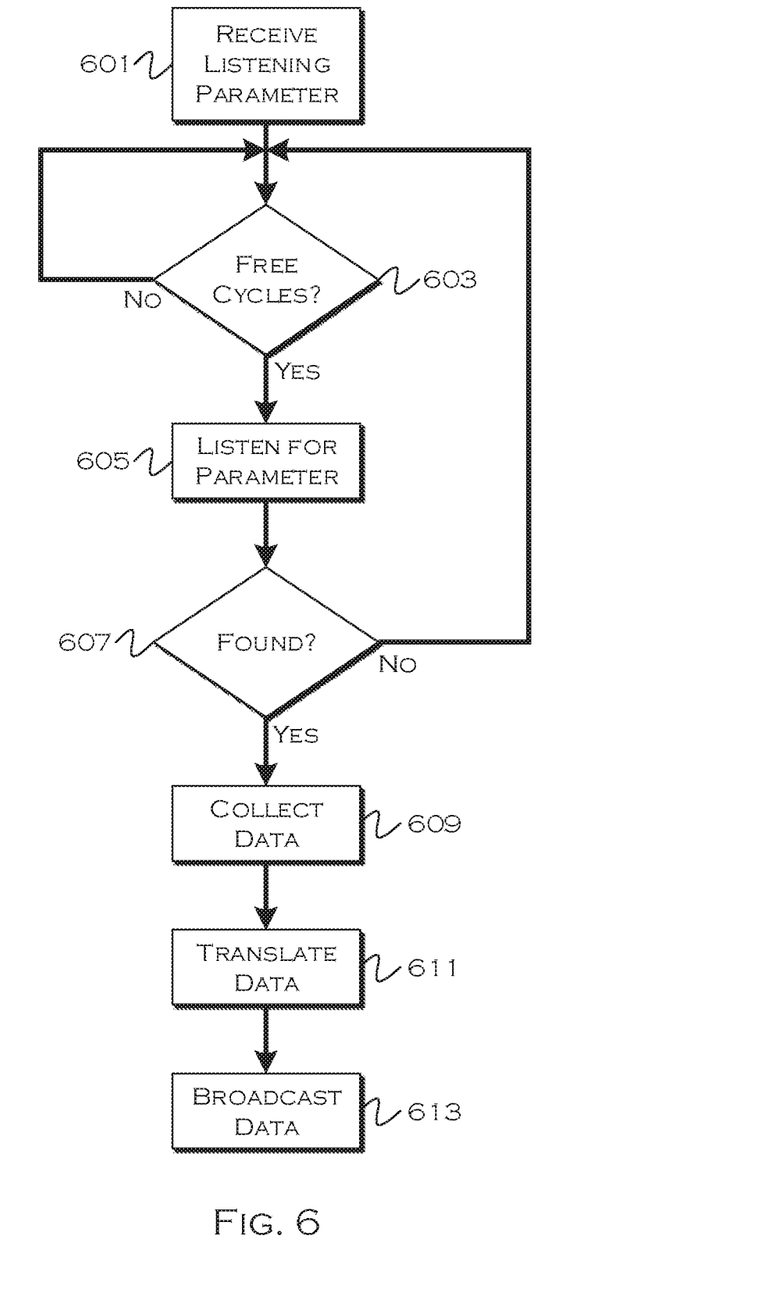
FIG. 6 shows an example of data gathering via ECUs.

FIG. 6 shows an example of data gathering via ECUs.

A possible issue with ECUs performing data gathering is that the data is coming from a wide variety of ECUs and in several different CAN messages and signals. Furthermore, most of that data must be translated in some way or another to be human readable or even readable to another system. Using other the distributed system to collect and translate the data ahead of time would be a powerful use of the system that would contribute greatly to future computing efforts. By having ECUs that are part of the system listen for certain signals (for example the window status, which may be transmitted from two to four different modules) and then collating that data into a single integer of several yes/no bits, the data can be cohesively sent back to the requesting module to be forwarded on out of the vehicle.

In the illustrative example shown, a requesting data gathering module issues a parameter to be observed. The module issues the request to the bus, so any ECU with available cycles can respond to the request.

In a particular ECU, the request is received from the bus 601. If a cycle is available 603, the ECU can listen for the parameter 605. The listened-for data can be data obtainable by the ECU via connected sensors or systems, and/or can include listening for other certain types of data on the bus itself. If one or more instances of the parameter are found 607, the ECU can collect the requested data 609 and translate the data into an exportable format 611. The ECU can then broadcast this data to the bus 613, where it can be collected by the requesting module for transport to an external source.

One example of an illustrative CAN system according to an illustrative embodiment is described below. The illustrative system includes several CAN enabled microcontrollers (ECUs) connected to a singular CAN Bus. Each ECU includes two main processes, one which creates busy time on the processor of the unit (the normal function) and another to report to the network that it is available for computing other, outside jobs. The first node that is ready for outside jobs would assign itself as the scheduler (visa vie a function included in the ECU allowing it to do so in response to no response to an "available" notification).

The message set for this system is defined in a CAN DBC file. For the sake of the larger number of possible messages on this system, 29-bit addressing is used as CAN addressing for this illustrative system. Each possible remote call would be pre-defined within the DBC file. This helps protects the system from arbitrary code and prevents decoding overhead on the worker ECUs.

A scheduler priority algorithm executing on each ECU advertises both how many jobs a particular ECU could handle and whether an ECU is eligible to take over as the scheduler of the system. When an ECU becomes idle and available for outside work, the ECU transmits an "RPC Ready" message with the scheduler priority as its payload. The current scheduler then determines if it should pass on its duties to the new comer or assign that ECU work. If an ECU were not assigned work, it would continue normal operations and remain idle until needed again. When needed again, it would send an "RPC Deny" message to inform the bus that it is no longer available for possible work.

An arbitrary ECU requests additional work to be done with the distributed computing resources of the system. If the resources are available, the scheduler sends an acknowledge message (ACK) back to the bus. The ACK message tells the requesting ECU that its work will be completed, and designates a particular resource to handle that job. The scheduler then re-transmits the job and the proper ECU (designated by the ACK message) executes the job.

Once the job is complete, the worker ECU send an RPC response that is usable by the requesting ECU and the worker ECU sends an additional "RPC ready" message to confirm its availability (or, in the case it is no longer available, it sends an "RPC Deny").

Distributed computing system utilizing the unused potential of the ECUs attached to a typical automotive CAN bus opens the door to cheaper automotive computing systems or a large number of computing nodes for a super computer. Such a system could perform a variety of tasks with more power than any single node could provide.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a first electronic control unit (ECU) processor configured to:
function as a scheduler, connected to a bus on a controller area network;
receive an availability notification, indicating ECU available processing power, from a second ECU connected to the bus;
responsive to a determination that the ECU available processing power is greater than processing power available locally on the first ECU, instruct the second ECU to become the scheduler;
receive requests for remote procedure calls from tertiary ECUs connected to the controller area network; and
queue the requests in one of either a first-in-first-out or round-robin queue, responsive to determining that sufficient processing power available locally on the first ECU exists to handle the given request.

2. The system of claim 1, wherein the processor is configured to assign the second ECU as a worker ECU responsive to a determination that the ECU available processing power is not greater than the processing power available locally on the first ECU.

3. The system of claim 1, wherein the processor is configured to broadcast a notification to the bus that processing power is available, responsive to at least a predetermined number of processing cycles being available for use to handle remote procedure calls on the first ECU.

4. The system of claim 3, wherein the processing power available locally to the first ECU is determined based on the number of processing cycles being available for use to handle remote procedure calls.

5. The system of claim 3, wherein the processor is configured to assign itself the job of scheduler, responsive to the notification receiving no response from another ECU on the controller area network.

6. The system of claim 1, wherein the processor is configured to broadcast a notification that processing power is available, responsive to instructing the second ECU to become the scheduler.

7. The system of claim 1, wherein the processor is configured to ignore a given received request, responsive to determining that insufficient processing power exists to handle the given received request.

8. The system of claim 1, wherein the processor is configured to process a given received request locally, responsive to determining that the processing power available locally on the first ECU is sufficient to handle the given received request.

9. The system of claim 8, wherein the processor is configured to select a worker ECU for handling at least a portion of the request, responsive to determining that the processing power available locally on the first ECU is insufficient to handle the given received request.

10. The system of claim 9, wherein the processor is configured to broadcast a response to the request, including an indicator of the selected worker ECU.

11. A system comprising:
an electronic control unit (ECU) processor configured to:
determine that a predetermined number of processing cycles are available for use by other ECUs;
broadcast availability notification to a bus on a controller area network, including an indicator of available processing power derived from the predetermined number;
receive a designation as a worker ECU or a designation as a scheduling ECU responsive to the broadcast.

12. The system of claim 11, wherein the processor is configured to function as a scheduling ECU, for scheduling remote procedure calls from other ECUs, responsive to receiving the designation as a scheduling ECU.

13. The system of claim 11, wherein the processor is configured to obtain a remote procedure call from the bus and process a command included in the remote procedure call.

14. The system of claim 13, wherein the processor is configured to broadcast a result of processing the command to the bus.

15. The system of claim 13, wherein the processor is configured to:
receive a predesignated normal function call from the bus while processing the command;
cease processing the command; and
broadcast a failure notification to the bus responsive to ceasing processing the command.

16. A system comprising:
a controller area network including at least a bus; and
a plurality of ECUs connected to the controller area network via the bus, wherein:
at least one of the ECUs includes a processor configured to:
receive designation of a parameter to be tracked, from the bus;
collect data corresponding to the parameter, responsive to the at least one ECU determining that processing cycles on the at least one ECU are available to be used to perform collection;

translate the data into a predesignated exportable format to generate formatted data; and broadcast the formatted data back to the bus.

* * * * *